United States Patent [19]

Kurabayashi et al.

[11] Patent Number: 5,618,338
[45] Date of Patent: Apr. 8, 1997

[54] LIQUID COMPOSITION, INK SET AND IMAGE-FORMING METHOD AND APPARATUS WHICH EMPLOY THE SAME

[75] Inventors: Yutaka Kurabayashi, Tokorozawa; Katsuhiko Takahashi, Yokohama, both of Japan

[73] Assignee: Canon Kabushiki Kaisha, Tokyo, Japan

[21] Appl. No.: 494,982

[22] Filed: Jun. 26, 1995

[30] Foreign Application Priority Data

Jul. 8, 1994 [JP] Japan ................................. 6-179765

[51] Int. Cl.$^6$ ............................................... C09D 11/14
[52] U.S. Cl. .................. 106/26 R; 106/22 F; 106/22 C; 106/163.01; 347/100
[58] Field of Search ............................. 106/22 F, 26 R, 106/22 C, 163.1, 217

[56] References Cited

U.S. PATENT DOCUMENTS

| | | | |
|---|---|---|---|
| 5,133,803 | 7/1992 | Moffatt | 106/22 F |
| 5,415,686 | 5/1995 | Kurabayashi et al. | 106/26 R |
| 5,439,515 | 8/1995 | Kurabayashi et al. | 106/20 R |

FOREIGN PATENT DOCUMENTS

| | | |
|---|---|---|
| 55-65269 | 5/1980 | Japan . |
| 55-66976 | 5/1980 | Japan . |
| 61-59911 | 12/1986 | Japan . |
| 61-59914 | 12/1986 | Japan . |
| 61-59912 | 12/1986 | Japan . |
| 63-299971 | 12/1988 | Japan . |
| 64-9279 | 1/1989 | Japan . |
| 64-63185 | 3/1989 | Japan . |

*Primary Examiner*—Helene Klemanski
*Attorney, Agent, or Firm*—Fitzpatrick, Cella, Harper & Scinto

[57] ABSTRACT

A liquid composition according to the present invention contains at least a cationic substance and finely ground cellulose. The invention further provides a liquid composition which contains a cationic substance having a molecular weight of 1000 or less and finely ground cellulose. The invention further provides an ink set which is obtained by combining the liquid composition with an ink, and an image-forming method and apparatus which employ the liquid composition and the ink.

25 Claims, 5 Drawing Sheets

LIQUID COMPOSITION, INK SET AND IMAGE-FORMING METHOD AND APPARATUS WHICH EMPLOY THE SAME

BACKGROUND OF THE INVENTION

1. Field of the Invention

The present invention relates to a technique of reducing the phenomenon known as color bleeding, which occurs when color images are formed on plain paper (having a surface which is not covered by any pigments or coatings), and a technique of producing water-resistant ink images, and more particularly to a liquid composition which can be applied to an ink jet image-forming process, an ink set obtained by combining an ink with that liquid composition, and image-forming methods and apparatus to which the liquid composition and ink set can be applied.

2. Description of the Related Art

In an ink jet recording process, recording is conducted by ejecting ink in the form of a small droplet and thereby attaching it to a recording medium, such as paper. Particularly, in an ink jet recording process of the type which employs, as discharge energy supply means, an electrothermal transducer to apply heat energy to ink and thereby generate a bubble which results in discharge of an ink droplet, a high-density multiple-orifice recording head can be readily manufactured, thus enabling high-resolution and high-definition images to be recorded at a high speed. Such an ink jet recording process has been disclosed in, for example, Japanese Patent Publication Nos. Sho 61-59911, Sho 61-59912 and Sho 61-59914.

Generally, ink employed in conventional ink jet recording methods contain water, which is its major component, and a water soluble high-boiling point solvent, such as glycol, for preventing drying or clogging of the nozzle. When recording is conducted on plain paper using such an ink, sufficient fixing may not be obtained or non-uniform images may be generated. It is believed that the latter problem occurs due to non-uniform distribution of filler or sizing agent on the surface of the recording paper. Further, in the case of color recording, inks of a plurality of colors are placed successively on top of ink of a certain color before the ink of that certain color has been fixed. Thus, colors may spread or be mixed non-uniformly on the boundary of images of different colors (hereinafter this phenomenon is called bleeding), thus making produced images unsatisfactory.

To enhance the fixing property, Japanese Patent Laid-Open No. Sho 55-65269 discloses a method of adding, to ink, a compound which enhances permeability, such as a surface active agent, and Japanese Patent Laid-Open No. Sho 55-66976 proposes the use of ink mainly composed of a volatile solvent. However, in the former method of adding, for example, a surface active agent to the ink, although permeability of the ink into the recording paper is enhanced and hence the fixing property or bleeding of the ink is improved accordingly, a coloring material in the ink may also penetrate the recording paper, thus reducing the density and saturation of an image. In addition, ink may expand in a lateral direction, thus reducing the sharpness of an edge or the resolution of an image. In the latter method which employs an ink mainly composed of a volatile solvent, clogging of a recording head nozzle due to evaporation of the solvent may occur in addition to the problems encountered in the former method.

To overcome the aforementioned problems, it has been proposed to attach to the recording medium a liquid which improves attachment of the ink prior to ejection of the ink.

For example, Japanese Patent Laid-Open No. Sho 63-299971 discloses a method of performing recording on a recording medium with ink which contains an anionic dye after a liquid containing an organic compound having two or more cationic groups per molecule has been attached to the recording medium. Japanese Patent Laid-Open No. Sho 64-9279 discloses a method of performing recording on a recording medium with ink containing an anionic dye after an acid liquid containing, for example, succinic acid, has been attached to the recording medium; Further, Japanese Patent laid-Open No. Sho 64-63185 proposes a method of applying liquid which makes a dye insoluble prior to recording with ink.

Although any of the above-described methods contemplates improvement of bleeding or water resistance of images due to dye precipitation, bleeding which occurs between the color inks may not be sufficiently restricted, or the precipitated dye may be distributed on the recording paper non-uniformly, causing poor coverage on pulp fibers of the recording paper and reducing the uniformity of the images.

SUMMARY OF THE INVENTION

In view of the aforementioned problems, the present invention intends to achieve the at least five goals. In particular, the present invention intends to achieve the following two goals in ink jet recording conducted on the normal paper:

(1) Excellent fixing property and excellent printing quality.
(2) Sufficient image density and highly uniform solid images.

In addition to the above two goals, the present invention also intends to achieve the following three goals in the color image formation process as conducted on plain.

(3) Prevention of bleeding.
(4) Excellent color reproducibility and high-definition images.
(5) Complete water resistance of recorded images.

To achieve the above objects, in a first aspect of the present invention, there is provided a liquid composition which contains at least a cationic substance and finely ground cellulose. In a second aspect of the present invention, there is provided a liquid composition which contains both a cationic substance having a molecular weight of 1000 or below and finely ground cellulose.

In a third aspect of the present invention, there is provided an ink set which contains the liquid composition provided in the first or second aspect and at least one ink selected from yellow, magenta, cyan, black, red, blue and green inks. In a fourth aspect of the present invention, there is provided an ink set which contains the liquid composition provided in the first or second aspect, and inks of three colors, namely, yellow, magenta and cyan. In a fifth aspect of the present invention, there is provided an ink set which contains the liquid composition provided in the first or second aspect, and inks of four colors, namely, yellow, magenta, cyan and black.

In a sixth aspect of the present invention, there is provided an image-forming method which comprises the steps of attaching the liquid composition provided in the first or second aspect to at least an image forming area of a recording medium, and applying an ink containing at least an anionic compound to the recording medium in an ink jet process.

In a seventh aspect of the present invention, there is provided an image-forming apparatus which comprises an ink set provided in any of the third to fifth aspects and ink jet means. In an eighth aspect of the present invention, there is provided an image forming apparatus which comprises a first recording unit having an accommodation portion and discharge means for the liquid composition provided in the first or second aspect, and a second recording unit having an accommodation portion and discharge means for an ink containing at least an anionic compound.

DETAILED DESCRIPTION OF THE PREFERRED EMBODIMENTS

Figure 1:
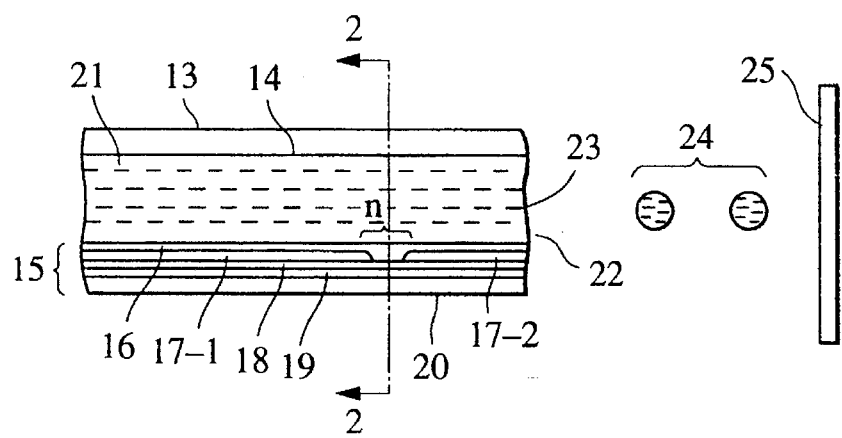
FIG. 1 is a longitudinal cross-sectional view of a head portion of an ink jet recording apparatus.

The function of a liquid composition containing a cationic substance according to the present invention will be described below with reference to FIGS. 9a–9e. In the interest of simplicity, recording using a dye ink containing a water-soluble dye having an anionic group will be described. The same function can be obtained even if a pigment ink containing both an anionic compound and a pigment is used for recording.

A liquid composition according to the present invention and an ink containing, for example, a dye containing an anionic compound as a coloring agent are used. The liquid composition is applied to the recording medium (FIG. 9(a)). When recording with ink is conducted and the liquid composition is mixed with the ink on the recording paper or at a position where the liquid composition penetrates the recording paper (FIG. 9(a)), a low molecular weight component in the cationic substance contained in the liquid composition associates with the anionic compound in the ink due to ionic interaction. This aggregates the dye in the ink and instantaneously separates it from the solvent phase, as shown in FIG. 9 (c). This production of small aggregate is the first stage of the reaction.

In the second stage of the reaction, the association of the anionic compound and the cationic substance having a low molecular weight is adsorbed to finely ground cellulose contained in the liquid composition which has an average particle size of 5.0 μm or less. This adsorption increases the size of the aggregate of the dye generated as a result of the association, forming an association product, as shown in FIG. 9 (d). Such aggregates do not readily enter gaps between the fibers of the recording paper. Accordingly, solid-liquid separation occurs, and only the liquid portion penetrates the recording paper, as shown in FIG. 9 (e). Consequently, both the printing quality and the fixing property of the ink can be improved.

In addition, since the viscosity of the aggregate generated by the above-described mechanism and formed of the low-molecular component of the cationic substance, the anionic dye and the finely ground cellulose increases, the aggregates do not move together with the liquid solvent. Therefore, even if adjacent dots are formed of inks of different colors, they do not mix with each other, unlike the aforementioned conventional full color image formation. Consequently, bleeding does not occur. Further, since the aggregates are substantially water-insoluble, the formed image is completely water-resistant. Further, the light fastness of the formed image is improved due to the light-blocking effect of the finely ground cellulose.

An embodiment of the present invention will now be described in detail.

First, the liquid composition containing a cationic substance according to the present invention will be described. The liquid composition according to the present invention contains at least a cationic substance, preferably, a cationic substance having a molecular weight of 1,000 or less on the basis of weight average and finely ground cellulose having an average particle size of 5.0 μm or less. More preferably, the liquid composition according to the present invention further contains a cationic polymer having a molecular weight of 2,000 or more on the basis of weight average.

The ink set according to the present invention employs the above-described liquid composition according to the present invention, and preferably employs both the liquid composition and a colored recording ink containing at least a dye having an anionic group or an ink containing at least both an anionic compound and a pigment.

As mentioned above, the cationic substance contained in the liquid composition is combined with a water-soluble dye having an anionic group or an anionic compound used together with a pigment, contained in the ink to form an associated substance due to ionic interaction. Such associated substances must be formed quickly.

The components of the liquid composition according to the present invention will be described below. Any cationic substance having a molecular weight of 1,000 or less can be employed as a cationic substance which is an essential component of the liquid composition according to the present invention. A preferable cationic substance is one having a low molecular weight ranging from 100 to 700.

Suitable examples of such a cationic substance include: a primary, secondary or tertiary amine salt compound, such as hydrochloride or acetate of lauryl amine, coconut amine, stearyl amine or rosin amine; a quaternary ammonium salt compound, such as lauryltrimethylammonium chloride, laurylbenzyltrimethyl chloride, lauryldimethylbenzylammonium chloride, benzyltributylammonium chloride or benzalconium chloride; a pyridinium salt compound, such as cetylpyridinium chloride or cetylpyridinium bromide; an imidazoline cationic compound, such as 2-heptadecenyl-hydroxyethylimidazoline; an ethylene oxide addition product of higher alkyl amine, such as N-hydroxyethyl stearylamine or N,N-Dihydroxyethyl stearylamine.

In the present invention, an amphoteric surfactant exhibiting the cationic properties within a certain pH range can also be employed as the cationic substance which is an essential component of the liquid composition according to the present invention. Examples of such surfactants include an amino acid type amphoteric surfactant; a R—NH—CH$_2$—CH$_2$—COOH type compound; a betaine compound, such as a carboxylic acid type amphoteric surfactant including stearyldimethyl betaine and lauryldihydroxyethyl betaine; a sulfate type amphoteric surfactant; a sulfonic acid type amphoteric surfactant; and a phosphate type amphoteric surfactant. When any of the above-mentioned amphoteric surfactants is used, the pH of the liquid composition according to the present invention or of the mixture of the liquid composition with the ink obtained on the recording medium must be adjusted to the isoelectric point or below of the liquid composition.

Examples of the low-molecular weight cationic compound that can be used in the present invention have been mentioned. However, any other effective compounds can also be employed.

Next, finely ground cellulose having an average particle size of 5.0 μm, which is another essential component of the liquid composition according to the present invention, will be described in detail. As mentioned above, in the second stage of the reaction of the liquid composition and the ink, finely ground cellulose molecules adsorb the association product of the dye having an anionic group and the low-molecular weight cationic substance, which was obtained in the first stage of the reaction of the liquid composition and the ink. This further increases the size of the dye aggregate generated as a result of association. Such aggregates do not readily enter gaps between the fibers of the recording paper difficult. Accordingly, the coloring agent in the ink remains on the recording paper while the liquid portion separates from the ink and penetrates the recording paper. Consequently both the printing quality and the fixing properties of the ink can be improved.

Finely ground cellulose having the above-described function is particulate or fine crystalline cellulose obtained by further grinding crystalline cellulose obtained by drying plant fibers. A desired particle size for finely ground cellulose employed in the present invention is on the order of an average particle size of 5.0 μm or below, as obtained by a laser scattering measurement.

To further improve the effect of the present invention, a cationic polymer having a molecular weight of 2,000 or more may also be used in the present invention in addition to finely ground cellulose. Examples of such a cationic polymer include a polyacrylamine hydrochloride, a polyaminesulfone hydrochloride, a polyvinylamine hydrochloride and chitosan acetate. The cationic polymer which can be employed in the present invention is not limited to these examples. Other hydrochlorides and acetates can also be used.

In the present invention, a nonionic polymer which is made partly cationic may be used as the above cationic polymer. Examples of such nonionic polymers include a copolymer of vinylpyrolidone and an aminoalkylalkylate quaternary salt, and a copolymer of acrylamide and an aminomethylacrylamide quaternary salt. However, the partially cationic nonionic polymer which can be used in the present invention is not limited to the above-described compounds.

The molecular weights referred in the present invention represent a weight-average molecular weight in terms of polyethylene oxide, obtained by GPC, unless otherwise specified.

The proportion of each of the above-described components contained in the liquid composition according to the present invention is preferably between 0.05 and 20% by weight, and more preferably, between 0.5 and 5% by weight. The optimum range is determined by the combination of the substances employed. Furthermore, the mixture ratio of the cationic substance to the finely ground cellulose is preferably between 10:1 and 1:10, in terms of weight, and more preferably between 5:1 and 1:5. If the mixture ratio exceeds 10:1, the water resistance of the printed matter is reduced. Conversely, if the mixture ratio is less than 1:10, bleeding is not sufficiently restricted, and the image's edge sharpness is reduced.

Components of the liquid composition other than those described above will now be described. The liquid composition according to the present invention generally contains water, a water-soluble organic solvent and appropriate additives in addition to the above-described cationic substance and finely ground cellulose.

Suitable examples of a water-soluble organic solvent which can be used in the present invention include an amide, such as dimethylformamide or dimethylacetoamide; a ketone, such as acetone; an ether, such as tetrahydrofuran or dioxane; a polyalkylene glycol, such as polyethylene glycol or polypropylene glycol; an alkylene glycol, such as ethylene glycol, propylene glycol, butylene glycol, triethylene glycol, 1, 2, 6-hexanetriol, thiodiglycol, hexylene glycol or diethylene glycol; a lower alkyl ether of a polyhydric alcohol, such as ethylene glycol methyl ether, diethylene glycol monomethyl ether or triethylene glycol monomethyl ether; a monohydric alcohol, such as ethanol, isopropyl alcohol, n-butyl alcohol or isobutyl alcohol; glycerin; N-methyl-2-pyrrolidone; 1,3-dimethylimidazolidinone; triethanolamine; sulfolane; and dimethylsulfoxide. The proportion of the water-soluble organic solvent is preferably between 5 and 60% by weight, and more preferably between 5 and 40% by weight, of the total liquid composition.

In addition to the above-described components, the liquid composition according to the present invention may also contain appropriate additives including a viscosity modifier, a pH controller, a preservative, various surfactants, an antioxidant and an evaporation accelerator. Selection of the surfactants is particularly important in terms of adjusting the permeability of the liquid into the recording medium.

The liquid composition according to the present invention is preferably colorless. It may alternatively have a light color if that color does not change the tone of the inks of various colors when mixed with those inks on the recording medium. Near 25° C., the pH of the liquid composition according to the present invention is between 3 and 12, preferably between 3 and 8 and more preferably between 3 and 5. The surface tension is between 10 and 60 dyne/cm, and more preferably between 10 and 40 dyne/cm. The viscosity is between 1 and 30 cps. It is preferable for the surface tension of the liquid composition according to the present invention to be less than that of the ink used together with the liquid composition. This is described below.

An ink which forms the ink set according to the present invention will now be described.

A preferred ink which can be used in the present invention contains as a coloring material a water-soluble dye containing an anionic group. Where the ink according to the present invention employs a pigment as the coloring agent, it also contains an anionic compound. In addition to these components, an ink which can be used in the present invention may also contain water, a water-soluble organic solvent and other components including a viscosity modifier, a pH adjuster, a preservative, a surfactant and an antioxidant, if necessary.

Any of the water-soluble acid dyes, direct dyes and reactive dyes described in The Color Index can be used in the present invention as the water-soluble dye containing an anionic group. Dyes which are not described in The Color Index can also be used as long as they have an anionic group, e.g., a sulfone or carboxyl group. It is noted that such water-soluble dyes include dyes in which their solubility is pH-dependent.

The same water-soluble organic solvents as those used for the liquid composition according to the present invention can be used as the water-soluble organic solvent contained in the ink containing a water-soluble dye as the coloring agent. The proportion of such a water-soluble organic solvent in the ink is the same as that of the water-soluble organic solvent in the liquid composition. Further, the desired properties of the ink are the same as those of the liquid composition. However, the desirable surface tension of the ink is higher than that of the liquid composition because it enables the image forming method according to the present invention to be carried out effectively. The present inventors hypothesize that the previously discharged liquid composition makes uniform the wettability of the ink discharged afterwards on the recording medium.

Where the ink used in the present invention employs a pigment as a coloring agent, the proportion of the pigment to the total ink is between 1 to 20% by weight, preferably between 2 and 12% by weight.

Carbon black may be used in the present invention as a pigment for a black ink. A desirable carbon black is the one manufactured by, for example, furnace method or channel method and characterized in that the primary particle size is between 15 and 40 mμ, that the specific surface area measured by BET (Brunauer-Emmett-Teller) method is between 50 and 300 $m^2/g$, that the DBP (Dibutyl phthalate) oil absorption is between 40 and 150 ml/100 g, that the proportion of volatile components is between 0.5 and 10% and that the pH is between 2 and 9. Examples of such a carbon black which is available on the market include: No. 2300, No. 900, MCF88, No. 33, No. 40, No. 45, No. 52, MA7, MA8, No. 2200B (products manufactured by Mitsubishi Kasei); RAVEN1255 (a product manufactured by Colombia); REGAL400R, REGAL330R, REGAL660R, MOGUL L (products manufactured by Cabot); and Color Black FW1, Color Black FW18, Color Black S170, Color Black S150, Printex 35, Printex U (products manufactured by Degusa).

Examples of a pigment used in the present invention for a yellow ink include C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83. Examples of a pigment used in the present invention for a magenta ink include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112 and C.I. Pigment Red 122. Examples of a pigment used in the present invention for a cyan ink include C.I. Pigment Blue 1, C.I. Pigment Blue 2, C.I. Pigment Blue 3, C.I. Pigment Blue 15: 3, C.I. Pigment Blue 16, C.I. Pigment Blue 22, C.I. Vat Blue 4 and C.I. Vat Blue 6. Pigments which can be used in the present invention are not limited to those mentioned above. New pigments manufactured for the present invention can also be used.

Although any water-soluble resin can be used as a dispersant contained in an ink which employs a pigment as a coloring agent, a desirable one is that having a weight average molecular weight of 1,000 to 30,000, more desirably one having a weight average molecular weight of 3,000 to 15,000. Examples of such a dispersant include a block copolymer, a random copolymer, a graft copolymer and a salt comprising at least two monomers (at least one of which is a hydrophilic monomer) selected from styrene, a styrene derivative, biphenylnaphthalene, a biphenylnaphthalene derivative, an aliphatic alcohol ester of an α,β-ethylenic unsaturated carboxylic acid, an acrylic acid, an acrylic acid derivative, maleic acid, a maleic acid derivative, itaconic acid, an itaconic acid derivative, fumaric acid, a fumaric acid derivative, vinyl acetate, vinylpyrrolidone, acrylamide and an acrylamide derivative. In addition, a natural resin, such as rosin, shellac or starch, can also be used as a dispersant. The above-described resins are soluble in an aqueous solution in which a base is dissolved, and alkali-soluble resins. The proportion of such a water-soluble resin employed as a pigment dispersant is between 0.1 and 5% by weight of the total weight of the ink.

In the case of an ink which contains any of the above-described pigments, the entire ink may be adjusted to be either neutral or alkali because in this way the solubility of the water-soluble resin used as a pigment dispersant can be improved and thus an ink exhibiting better long-term storage properties can be provided. However, such an ink may corrode various members used in an ink jet recording apparatus. Hence, a desirable pH value of the ink for eliminating such a problem is between 7 and 10.

Examples of a pH adjuster employed in the above-described pH adjustment operation include an organic amine, such as diethanolamine or triethanolamine; an inorganic alkali agent, such as a hydroxide of an alkali metal which may be sodium hydroxide, lithium hydroxide or potassium hydroxide; an organic acid; and mineral acid. The pigment and the water-soluble resin which is a dispersant are dispersed or dissolved in an aqueous liquid medium.

A preferred example of the aqueous liquid medium used in an ink which contains a pigment and is employed in the present invention is a solvent mixture of water and a water-soluble organic solvent. Preferably, ion-exchanged water (deionized water) is used instead of water containing various ions.

Suitable examples of a water-soluble organic solvent used in a mixture together with water include: an alkyl alcohol having 1 to 4 carbon atoms, such as methyl alcohol, ethyl alcohol, n-propyl alcohol, isopropyl alcohol, n-butyl alcohol, sec-butyl alcohol or tert-butyl alcohol; an amide, such as dimethylformamide or dimethylacetamide; a ketone or a keto alcohol, such as acetone or diacetone; an ether, such as tetrahydrofuran or dioxane; a polyalkylene glycol, such as polyethylene glycol or polypropylene glycol; an alkylene glycol having an alkylene group having 2 to 6 carbon atoms, such as ethylene glycol, propylene glycol, butylene glycol, triethylene glycol, 1,2,6-hexanetriol, thiodiglycol, hexyleneglycol or diethylene glycol; a glycerin; a lower alkyl ether of a polyhydric alcohol, such as ethylene glycol monomethyl (or ethyl) ether, diethylene glycol methyl (or ethyl) ether or triethylene glycol monomethyl (or ethyl) ether; N-methyl-2-pyrrolidone; 2-pyrrolidone; and 1,3-dimethyl-2-imidazolidinone. Among these water-soluble organic solvents, a polyhydric alcohol, such as diethylene glycol and a lower alkyl ether of a polyhydric alcohol, such as triethylene glycol monomethyl (or ethyl) ether are preferable.

The proportion of such a water-soluble organic solvent in the ink is generally between 3 and 50% by weight, preferably between 3 and 40% by weight, of the total weight of the ink. The proportion of water is generally between 10 and 90% by weight, preferably between 30 and 80% by weight of the total weight of the ink.

In addition to the above-described components, the ink employed in the present invention and containing a pigment may also contain a surfactant, a defoaming agent, a preservative, etc. to exhibit desired physical properties, if necessary. In addition to the above-described pigment, an appropriate amount of water-soluble dye may also be added to the ink as the coloring agent. Further, in the case of an ink containing a pigment, the surface tension of the ink may be made higher than that of the liquid composition according to the present invention, as in the case where the ink employs a water-soluble dye as a coloring agent. The surface tension of the ink may be adjusted by adjusting the amount of surfactant or the like in the ink.

The method of forming an ink containing the above-described pigment comprises the steps of adding a pigment to an aqueous medium containing at least a water-soluble resin as a dispersant and water, agitating the resultant mixture, dispersing the mixture using dispersion means which will be described later, and if required, performing centrifugal separation. The method of forming an ink employed in the present invention further comprises the steps of adding a sizing agent and appropriate additive components to the obtained dispersant, and agitating the mixture.

For any of the above-described alkali-soluble resins to be used as a dispersant, a base must be added to dissolve the resin. Suitable examples of such a base include an organic amine, such as monoethanolamine, diethanolamine, triethanolamine, amine methylpropanol or ammonia; and an inorganic salt, such as potassium hydroxide or sodium hydroxide.

Further, in the method of forming the ink containing a pigment, it is effective to premix the aqueous medium containing a pigment by agitation for 30 minutes before the dispersion treatment. That is, the premixing operation is desirable because it improves the wettability of the surface of the pigment and thus accelerates adsorption of the dispersant to the pigment surface.

Any dispersion machine can be used for the above-described dispersion treatment of the pigment. For example, a ball mill, a roll mill or a sand mill can be used. In such a mill, a high-speed type sand mill is preferable. Examples of such a high-speed sand mill include Super Mill, Sand Grinder, Beads Mill, Agitator Mill, Grain Mill, Dyno Mill, Pearl Mill and Cobal Mill (all of which are trade names).

To avoid clogging which would occur in an ink jet recording method when an ink containing a pigment is used, a pigment having an optimal particle size distribution is used in the ink. A pigment having a desired particle size distribution may be obtained by reducing the size of the grinding medium for a dispersion machine, by increasing the packing rate of the grinding medium, by increasing the treating time, by reducing the discharge speed, by removing the particles of undesirably large sizes using a filter or a centrifugal separator after grinding or by a combination of any of these methods.

In the present invention, when an ink containing a pigment is employed, an anionic compound, such as an anionic surfactant or an anionic polymer substance, may be added to the ink in addition to the above-described various components. The addition of such an anionic substance is particularly useful when an anionic compound is not used as a dispersant. The proportion of such an anionic compound is between 0.05 and 10% by weight, preferably between 0.2 and 5% by weight.

In a preferred embodiment, an anionic surfactant whose pH value is adjusted to its isoelectric point or below may be added. Examples of an anionic surfactant which can be used include a carboxylate, a sulfate, a sulfonate and a phosphate.

Examples of an anionic polymer substance include an alkali-soluble resin, such as sodium polyacrylate or a polymer which is partially copolymerized with an acrylic acid. Other anionic compounds can also be used.

Next, the image-forming method according to the present invention will be described. The image-forming method according to the present invention comprises the steps of (A) attaching the above-described liquid composition to an image-forming area or to both an image forming area and its vicinity on the recording medium and (B) ejecting an ink containing a dye containing at least an anionic group or an ink containing at least an anionic compound and a pigment from a discharge orifice toward the recording medium in the form of a droplet in response to a recording signal.

In the present invention, "image-forming area" refers to an area to which dots of ink are attached. "Vicinity of the image-forming area" refers to an area lying outside of the area to which the ink dots are to be attached in a width corresponding to 1 to 5 dots.

Any image forming method can be used in the present invention as long as it provides a state in which the liquid composition according to the present invention and the ink coexist on the recording medium. Thus, it does not matter whether the liquid composition or the ink is first applied to the recording medium. Where the liquid composition is applied to the recording medium first, there is no limitation on the time interval between the application of the liquid composition and the application of the ink to the recording medium. The ink may be applied almost concurrently with or within several seconds after application of the liquid composition to the recording medium.

There is no limitation on the recording medium used in the above image-forming method, and conventional plain paper, such as copying paper and bond paper, can be suitably used. Of course, coated paper specially produced for ink jet recording or OHP (over head projection) transparent films can also be used. In addition, superior paper and glossy paper can also be used.

The liquid composition may be applied to the entire surface of the recording medium by spraying or by a roller. A more preferable method of applying the liquid composition is to attach the liquid composition selectively and uniformly only to the image-forming area to which the ink is or will be attached, or only to both the image-forming area and its vicinity. In that case, an ink jet recording method of the type in which the liquid is discharged using a bubble generated by heat energy is preferably used.

Figure 2:
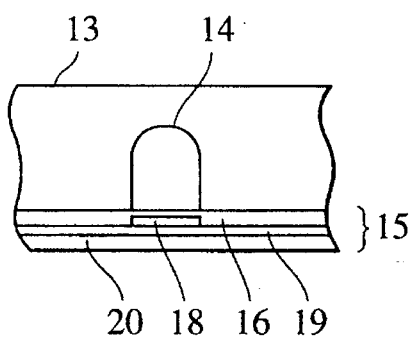
FIG. 2 is a lateral cross-sectional view of the head portion of the ink jet recording apparatus.
Figure 3:
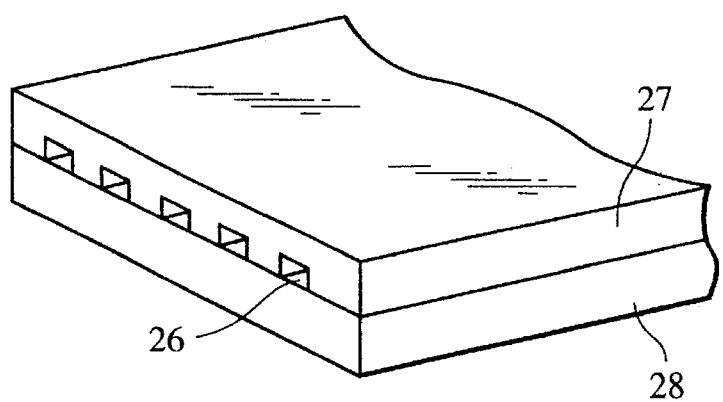
FIG. 3 is a perspective view of the head portion of the ink jet recording apparatus.

Next, the recording apparatus employed in the present invention will be described. The recording apparatus preferably used in the present invention is the on-demand type, in particular, the type in which a liquid droplet is discharged by heat energy generated as a result of application of a recording signal to the recording ink in a recording head. FIGS. 1 to 3 illustrate a recording head which is the essential part of such an apparatus.

A head 13 is formed by adhering a heating head 15 (a heating head is not limited to that shown in the figures) having a heating resistor used for heat-sensitive recording, to an ink flow passage made of, for example, glass, ceramic or plastic. The heating head 15 includes a protective film 16 formed of, for example, silicon oxide, aluminum electrodes 17-1 and 17-2, a heating resistor layer 18 formed of, for example, nichrome, a heat accumulating layer 19, and a substrate 20 made of, for example, alumina exhibiting good heat radiation.

A recording ink 21 reaches a discharge orifice 22, and forms a meniscus under a pressure P.

When an electric signal is applied to the electrodes 17-1 and 17-2, an area of the heating head 15, indicated by 'n', is rapidly heated, generating a bubble in the ink 21 which is in contact with that area. A meniscus discharged from the orifice 22 due to the pressure of the bubble forms a recording droplet 24 which flies toward a recording medium 25. FIG. 3 is a schematic view of a recording head in which a large number of nozzles shown in FIG. 1 are arranged. The recording head is manufactured by closely adhering a heating head 28, which is the same as that described in connection with FIG. 1, to a glass plate 27 having a large number of flow passages.

FIG. 1 is a cross-sectional view of a head 13 taken along the ink flow passage. FIG. 2 is a section taken along the line 2—2 of FIG. 1.

Figure 4:
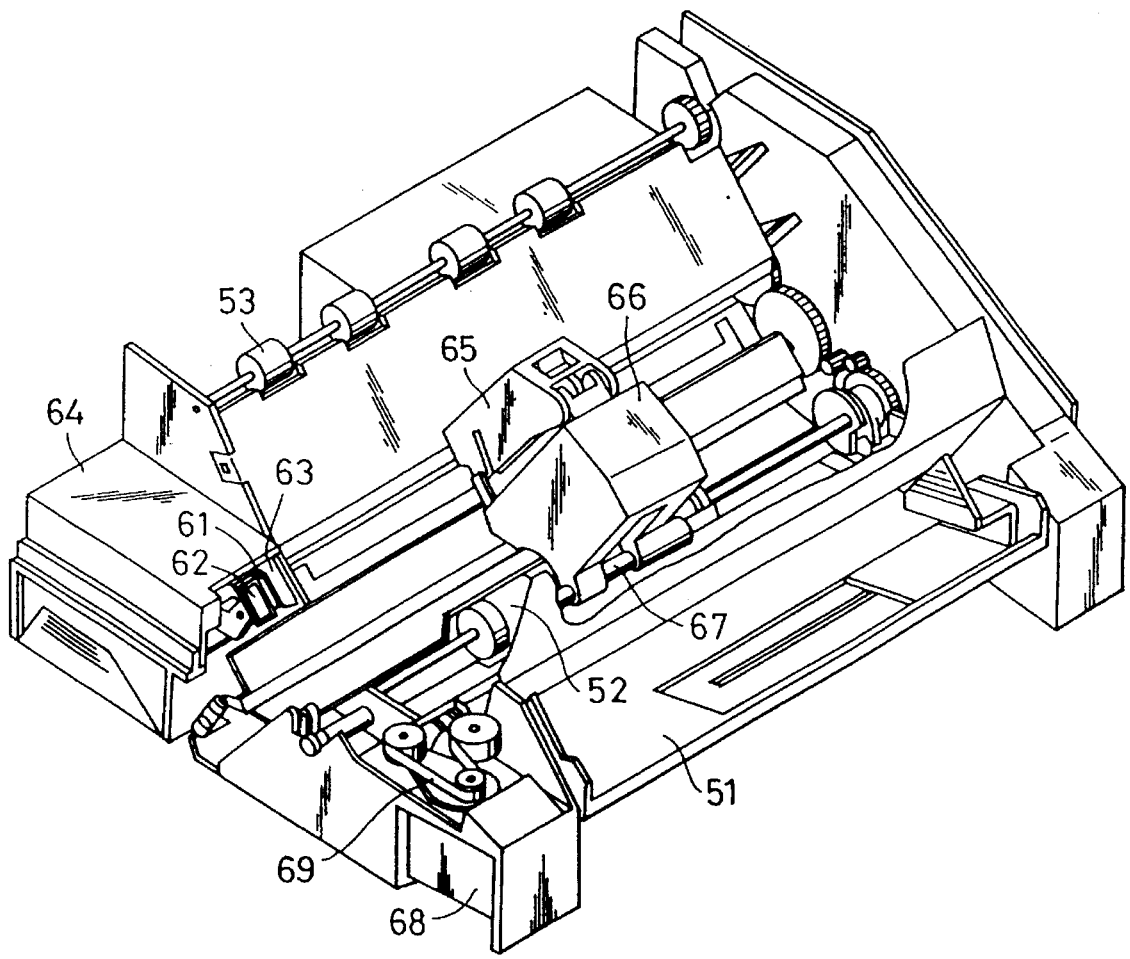
FIG. 4 is a perspective view of an example of the ink jet recording apparatus.

FIG. 4 illustrates an ink jet recording apparatus in which the head is assembled.

In FIG. 4, reference numeral 61 denotes a blade serving as a wiping member. One end of the blade 61 is a fixed end held by a blade holding member. The blade 61 is shaped as a cantilever. The blade 61 is disposed at a position which adjoins the recording area formed by the recording head. A cap 62 is movable in the direction perpendicular to the direction in which the recording head is moved to contact a discharge port surface for capping. An ink absorber 63 is provided adjacent to the blade 61. Like the blade 61, the ink absorber protrudes into the path in which the recording head is moved. The blade 61, the cap 62 and the absorber 63 constitute a discharge recovering portion 64. The blade 61 and the absorber 63 remove the water contents or dust on the ink discharge port surface.

A recording head 65 has energy generation means to discharge ink to a recording material which opposes the discharge port surface on which the discharge ports are arrayed for recording. A carriage 66 carries the recording head 65 thereon and moves the recording head 65. The carriage 66 slidably engages with a guide shaft 67. A portion of the carriage 66 is connected (not shown) to a belt 69 driven by a motor 68. Accordingly, the carriage 66 can be moved along the guide shaft 67 and consequently the recording head 65 can be moved in the recording area and the area adjacent to the recording area.

A paper feeding portion 51 is used for inserting the recording material. A paper feed roller 52 is driven by a motor (not shown). This structure allows the recording material to be fed to a position where the recording material opposes the discharge port surface of the recording head. As recording proceeds, the recording paper is discharged to a paper discharge portion in which a paper discharge roller 53 is disposed.

When the recording head 65 returns to a home position after recording is completed, the discharge port surface of the recording head 65 is wiped because the cap 62 of the discharge recovering portion 64 is at a retracted position from the path along which the recording head 65 is moved while the blade 61 is protruding into that path. When the cap 62 comes into contact with the discharge port surface of the recording head 65 for capping it, the cap 62 moves in such a manner that it protrudes into the path along which the recording head is moved.

When the recording head 65 moves from the home position to a recording starting position, the cap 62 and the blade 61 are at the same positions as those where they are located when the above-described wiping operation is conducted, and the discharge port surface of the recording head 65 is thus wiped.

Movement of the recording head to the home position occurs not only when recording is completed or for the discharge recovery operation, but also at predetermined time intervals during the movement of the recording head for recording in the recording area. Each time the recording head 65 is moved to the home position, wiping is conducted.

Figure 5:
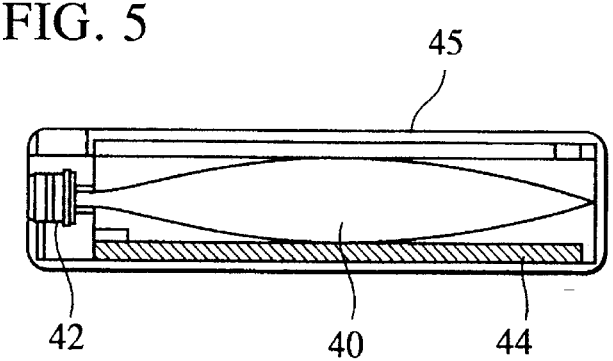
FIG. 5 is a longitudinal cross-sectional view of an ink cartridge.

FIG. 5 illustrates an example of an ink cartridge in which ink to be supplied to the head through an ink supply member, e.g., a tube, is accommodated. An ink accommodating portion 40 accommodates ink to be supplied to the head. The ink accommodating portion may be an ink bag. A rubber plug 42 is provided at the distal end of the ink bag. Supply of the ink in the ink bag 40 is enabled by inserting a thread (not shown) into the plug 42. An absorber 44 receives ink waste.

A desirable ink accommodating portion is of the type in which the ink-contacting surface is made of polyolefin, particularly, polyethylene.

Figure 6:
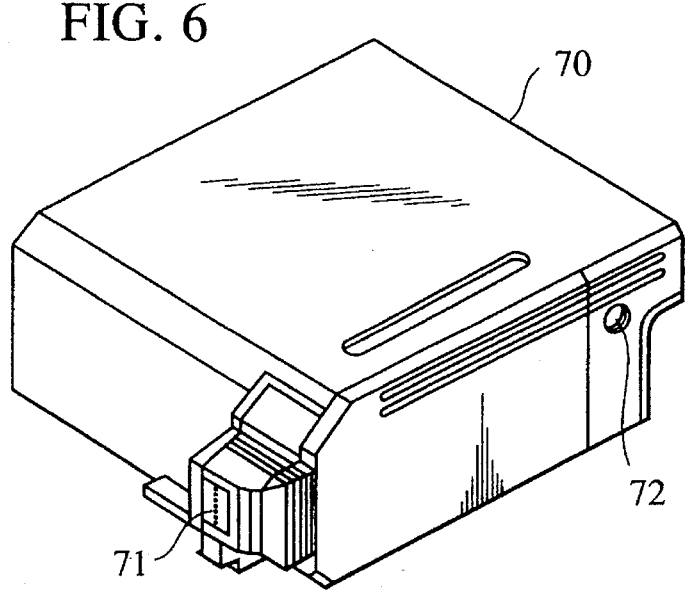
FIG. 6 is a perspective view of a recording unit.

Not only the above-described ink jet recording apparatus in which the head and the ink cartridge are provided separately but also an ink jet recording apparatus in which the head and the ink cartridge are formed as one unit, as shown in FIG. 6, can be used in the present invention.

In FIG. 6, a recording unit 70 includes an ink accommodating portion for accommodating ink, e.g., an ink absorber. The ink in such an ink absorber is discharged as ink droplets from a head portion 71 having a plurality of orifices. The ink absorber may be made of polyurethane. The interior of the recording unit communicates with the air through an air port 72. The recording unit 70 can replace the recording head shown in FIG. 4. The recording unit 70 can be mounted on and removed from the carriage 66. The ink jet recording apparatus which has been described above is of the type in which heat energy is applied to the ink to discharge an ink droplet. In the present invention, a piezo type ink jet recording apparatus which uses piezoelectric elements can also be used.

Figure 7:
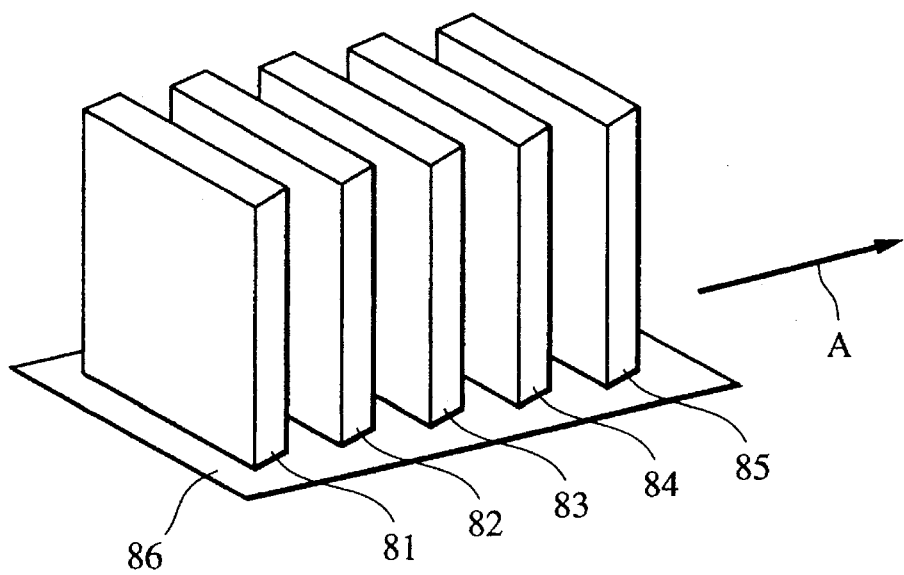
FIG. 7 is a perspective view of a recording portion in which a plurality of recording heads are arrayed, employed in an embodiment of the present invention.
Figure 8:
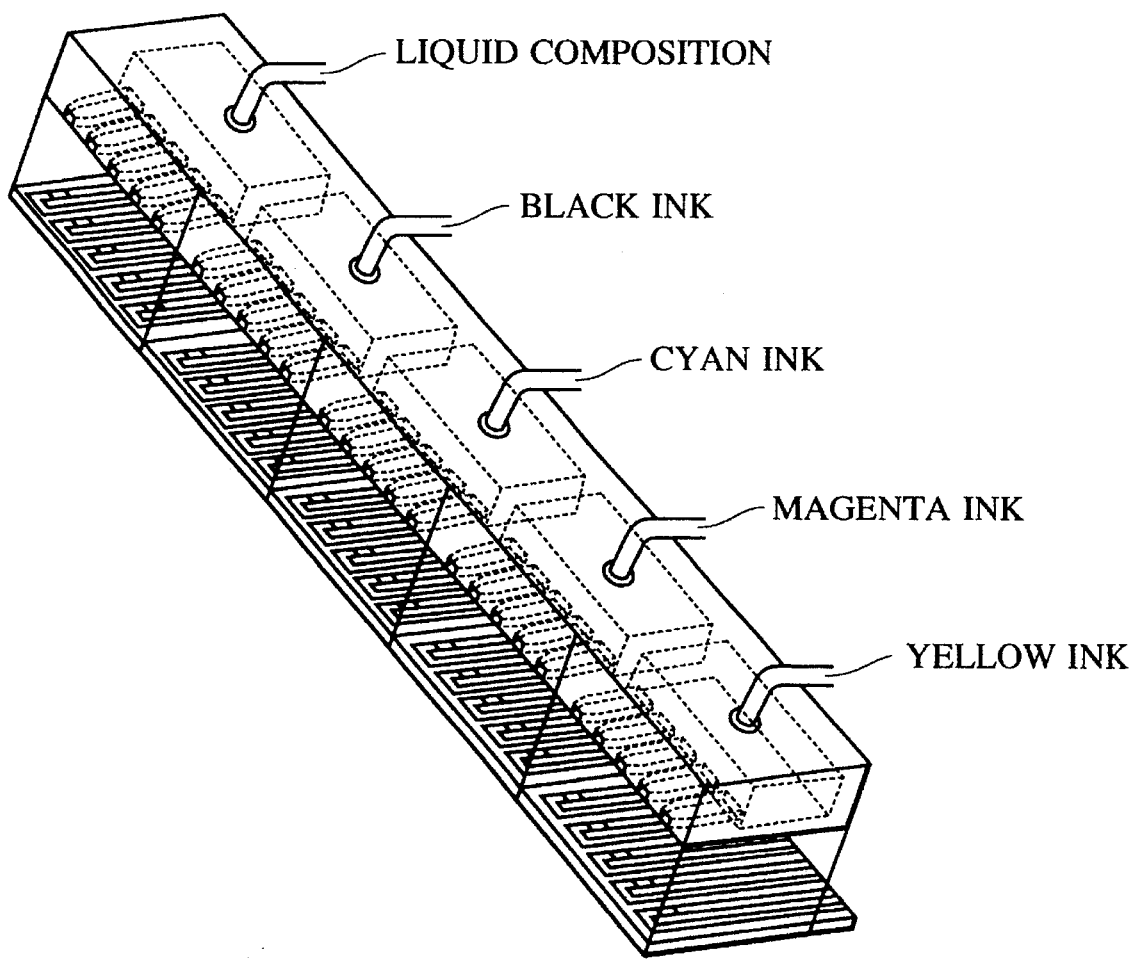
FIG. 8 is a perspective view of another recording head employed in the present invention.
Figure 9A:
FIGS. 9a, 9b, 9c, 9d and 9e illustrate the concept of an image-forming method according to the present invention.
Figure 9B:
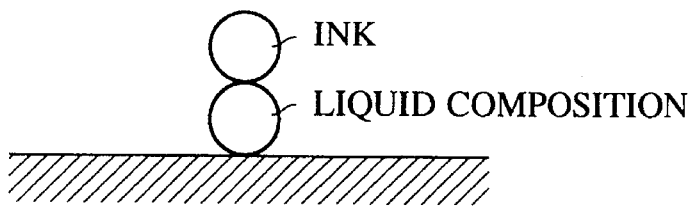
Figure 9C:
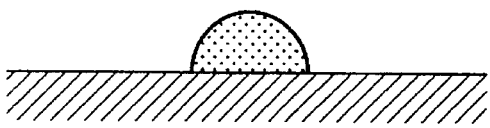
Figure 9D:
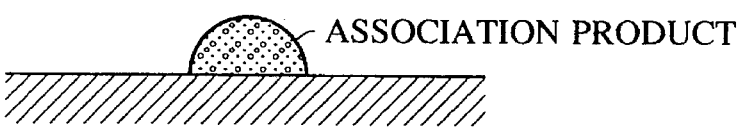
Figure 9E:
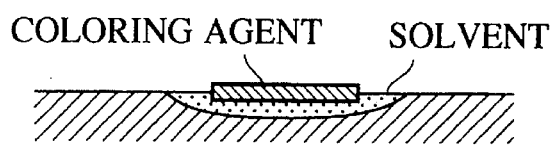

To carry out the recording method according to the present invention, a recording apparatus in which five recording heads as shown in FIG. 3 are arranged on the carriage may be used. FIG. 7 illustrates an example of such a recording apparatus, wherein carriage 86 moves in the direction of arrow A. Recording heads 81, 82, 83 and 84 discharge recording inks of yellow, magenta, cyan and black, respectively. Recording head 85 discharges a colorless liquid composition. The heads are disposed in the recording apparatus to discharge recording inks of the respective colors in response to a recording signal. The colorless liquid composition may be attached to at least the portion of the recording paper where the recording ink of each color will be attached, prior to the discharge of any colored recording ink. While the recording apparatus is shown in FIG. 7 as having five recording heads, alternate embodiments, such as that shown in FIG. 8, of the present invention could include a recording apparatus incorporating a single recording head having separate flow passages for yellow ink, magenta ink, cyan ink, black ink and the colorless liquid composition.

Other embodiments of a recording apparatus contemplated herein include recording heads which are arranged so that the order in which the liquid composition and inks are recorded is reversed, namely, so the colorless liquid composition is discharged last.

EXAMPLES

The present invention will now be described in more detail by way of examples and comparative example. All "parts" and "%" hereinafter referred to are in weight terms unless otherwise stated. The particle size of the finely ground cellulose was measured by the laser scattering method. The molecular weight of cationic substances hereinafter referred to is a weight-average molecular weight in terms of polyethylene oxide, obtained by GPC, unless otherwise mentioned. The weight average molecular weight of the dispersant for a pigment ink was measured by GPC which employed a styrene polymer Ms reference.

Example 1

The following components were mixed and dissolved and then filtered under pressure using a membrane filter having a pore size of 0.22 μm (trade mark: Fluoro Porefilter, manufactured by Sumitomo Denko) to obtain a liquid composition A whose pH was adjusted to 4.8.

Components of liquid composition A

| | |
|---|---|
| Benzyltri-n-butylammonium chloride | 5.0 parts |
| Ceolus Cream | 10.0 parts |
| (Average particle size 3.5 μm) | |
| [fine crystalline cellulose, 10% slurry, manufactured by Asahi Kasei] | |
| Diethylene glycol | 10.0 parts |
| Ion-exchanged water | 75.0 parts |
| (Manufacture of ink I) | |

Next, the following components were mixed and then filtered under pressure using a membrane filter having a pore size of 0.22 μm (trade mark: Fluoro Porefilter, manufactured by Sumitomo Denko) to obtain inks Y1, M1, C1 and B1 of yellow, magenta, cyan and black, each containing a dye having an anionic group and having a pH of 4.8. Y1, M1, C1 and B1 constitute an ink I.

Yellow ink Y1

| | |
|---|---|
| C.I. Direct Yellow | 2 parts |
| Thiodiglycol | 10 parts |
| Acethynol EH | 0.05 part |
| Ion-exchanged water | 87.95 parts |

Magenta ink M1

| | |
|---|---|
| C.I. Acid Red 289 | 2.5 parts |
| Thiodiglycol | 10 parts |
| Acethynol EH | 0.05 parts |
| Ion-exchanged water | 87.45 parts |

Cyan ink C1

| | |
|---|---|
| C.I. Acid Blue 9 | 2.5 parts |
| Thiodiglycol | 10 parts |
| Acethynol EH | 0.05 part |
| Ion-exchanged water | 87.45 parts |

Black ink B1

| | |
|---|---|
| C.I. Food Black 2 | 4.0 parts |
| Thiodiglycol | 10 parts |
| Acethynol EH | 0.05 part |
| Ion-exchanged water | 85.95 parts |

An ink set according to the present invention was formed using the thus-obtained liquid composition A and ink I, and recording was conducted on PPC paper (Plain Paper for Copying machines, which is the same as "plain paper" stated at page 1, line 10) (manufactured by Canon) using that ink set. A recording apparatus as shown in FIG. 4 was used. Five recording heads as shown in FIG. 7 were used to form color images. The liquid composition A was discharged and attached first to the recording paper, and then the ink I was attached. The recording head used in this example had a recording density of 360 dpi (dots per inch), and was driven at a driving frequency of 5 kHz. The discharge volume per dot of each of the heads used for the yellow, magenta and cyan inks and liquid composition was 40 pl, and that of the head for the black ink was 80 pl.

The above-described recording conditions apply to the following Examples and Comparative Examples which employed an ink containing a dye. Environmental conditions for printing test, 25° C./55% RH (relative humidity), were the same throughout the Examples and Comparative Examples.

Example 2

Using an ink set formed of a combination of the liquid composition A and the ink I, used in Example 1, printing was conducted in the same manner as in Example 1 with the exception that attachment of liquid composition A on the recording paper followed ejection of the ink I.

Example 3

A liquid composition B composed of the following components was manufactured in the same manner as in the liquid composition A of Example 1

Components of liquid composition B

| | |
|---|---|
| PAA-HCL (Polyallylamine hydrochloride) | 0.5 part |
| (Mw = 10,000) | |
| Ceolus Cream | 10.0 parts |
| (Average particle size 3.5 μm) | |
| [fine crystalline cellulose, 10% slurry, manufactured by Asahi Kasei] | |
| Laurylbenzyltrimethyl chloride | 1.0 part |
| Diethylene glycol | 10.0 parts |
| Ion-exchanged water | 78.5 parts |

An ink set according to the present invention was formed using the thus-obtained liquid composition B and ink I containing a dye, and recording was conducted on PPC paper (manufactured by Canon) in the same conditions as those of Example 1 using that ink set. Attachment of the ink I followed ejection and attachment of the liquid composition B to the recording paper.

Example 4

Using an ink set formed of a combination of the liquid composition B employed in Example 3 and the ink I containing a dye as a coloring agent, printing was conducted in the same manner as in Example 3 with the exception that attachment Of the liquid composition B on the recording paper followed ejection of the ink I.

Example 5

Inks of yellow, magenta, cyan and black, Y2, M2, C2 and B2, each containing a pigment and an anionic compound, were obtained in the following manner. The inks Y2, M2, C2 and B2 constitute an ink II. Using an ink set according to the present invention constituted by the thus-obtained ink II and the liquid composition A employed in Example 1, recording was conducted on PPC paper (manufactured by Canon). Liquid composition A was discharged and attached first to the recording paper, and then the ink II was attached. The recording head used in this example had a recording density of 360 dpi, and was driven at a driving frequency of 5 kHz. The discharge volume per dot of each of the heads used for the yellow, magenta and cyan inks and liquid composition A was 40 pl, and that of the head for the black ink was 60 pl per dot.

The above-described recording conditions apply to the following Examples which employed an ink containing a pigment. Environmental conditions for the printing test, 25° C./55% RH, are the same throughout the Examples. (Manufacture of ink II)

Black ink B2

(Manufacture of pigment dispersant)

| | |
|---|---|
| Copolymer of styrene-acrylic acid-ethyl acrylate (Acid number 140, weight average molecular weight 5,000) | 1.5 parts |
| Monoethanol amine | 1.0 part |
| Diethylene glycol | 5.0 parts |
| Ion-exhanged water | 81.5 parts |

The above components were mixed and heated to 70° C. in a water bath to completely dissolve the resins. 10 parts of carbon black (MCF88, manufactured by Mitsubishi Kasei) and 1 part of isopropyl alcohol were added to the thus-obtained solution. After premixing was conducted on the mixture for 30 minutes, a dispersion treatment was conducted under the following conditions:

·Dispersing machine: Sand grinder (manufactured by Igarashi Kikai)
·Grinding medium: Zirconium beads having a diameter of 1 mm
·Charge rate of the grinding medium: 50% (volume ratio)
·Grinding time: 3 hours Thereafter, centrifugal separation (12,000 rpm, 20 minutes) was conducted to obtain a dispersant from which rough particles were removed.

(Manufacture of ink)

The components having the following composition ratio were admixed with the above-described dispersant to manufacture an ink containing a pigment, black ink B2.

| | |
|---|---|
| The above pigment dispersant | 30 parts |
| Glycerin | 10 parts |
| Ethylene glycol | 5.0 parts |
| N-methylpyrrolidone | 5.0 parts |
| Ethyl alcohol | 2.0 parts |
| Ion-exchanged water | 48.0 parts |

Yellow ink Y2

Yellow ink Y2 containing a pigment was prepared in the same manner as that of the black ink B2 with the exception that 10 parts of Pigment Yellow 74 was employed in place of carbon black used to prepare the black ink B2.

Magenta ink M2

Magenta ink M2 containing a pigment was prepared in the same manner as that of the black ink B2 with the exception that 10 parts of Pigment Red 7 was employed in place of carbon black used to prepare the black ink B2.

Cyan Ink C2

Cyan ink C2 containing a pigment was prepared in the same manner as that of the black ink B2 with the exception that 10 parts of Pigment Blue 15 was employed in place of carbon black used to prepare the black ink B2.

Example 6

Using an ink set formed of a combination of the liquid composition A used in Example 1 and the ink II containing a pigment as a coloring agent, printing was conducted in the same manner as in Example 1, with the exception that attachment of the ink II on the recording paper was followed by ejection of the liquid composition A.

Example 7

Using an ink set according to the present invention formed of a combination of the liquid composition B used in Example 3 and the ink II containing a pigment and used in Example 5, recording was conducted on PPC paper (manufactured by Canon) under the same conditions as those of Example 3. Attachment of the ink II followed ejection and attachment of the liquid composition B to the recording paper.

Example 8

Using an ink set formed of a combination of the liquid composition B employed in Example 3 and the ink II containing a dye as a coloring agent and used in Example 5, printing was conducted in the same manner as in Example 1 with the exception that attachment of the ink II on the recording paper preceded ejection of the liquid composition B.

Comparative Example 1

Printing and evaluation were conducted in the same manner as in Example 1 with the exception that the liquid composition A used in Example 1 was not used.

[Evaluation]

The recording images of Example 1 to Example 8 and Comparative Example 1, listed in Table 1, were evaluated in the following method and with reference to the following standards.

TABLE 1

Examples 1 to 8 and Comparative Example 1

| | Liquid composition | Ink | Precedence of liquid composition or recording ink |
|---|---|---|---|
| Example 1 | A | I | Liquid composition precedes |
| Example 2 | A | I | Liquid composition follows |
| Example 3 | B | I | Liquid composition precedes |
| Example 4 | B | I | Liquid composition follows |
| Example 5 | A | II | Liquid composition precedes |
| Example 6 | A | II | Liquid composition follows |
| Example 7 | B | II | Liquid composition precedes |
| Example 8 | B | II | Liquid composition follows |
| Comparative Example 1 | — | I | Recording ink alone |

1. Image density

A solid image was formed using the liquid composition and black ink. After the image was exposed to air for 12 hours, the reflection density of that image was measured with a reflection density meter Macbeth RD915 (manufactured by Macbeth).

Evaluation standards are as follows:

⊚: Reflection density of 1.30 or above o: Reflection density from 1.25 to less than 1.30

Δ: Reflection density from 1.15 to less than 1.25 x: Reflection density of less than 1.15

2. Fixing property

A solid image was formed using the liquid composition, yellow ink and magenta ink. Another sheet of white paper was placed on that recorded image by its own weight. The time it took for the recorded image to no longer be transferred onto the back of the paper and to no longer soil the paper was measured, with the time when recording was completed as time zero, to evaluate the fixing property. Evaluation standards are as follows:

⊚: Fixing property of less than 20 seconds o: Fixing property from 20 seconds to less than 30 seconds Δ: Fixing property from 30 seconds to less than 40 seconds x: Fixing property of 40 seconds or above 3. Character quality Alphanumeric characters were printed in black using the liquid composition and black ink and the quality of the characters was visually evaluated. "⊚" was marked for the characters in which feathering was hardly recognized. "o" was marked for the characters in which feathering was slightly recognized, but to an extent that would not be a problem in practical operation. "x" was marked for the images in which feathering was recognized at a level higher than that of the images marked with "o".

4. Bleeding

Solid images were formed adjacent to each other using the liquid composition and inks of yellow, magenta, cyan and black in the same printing mode as the printing mode E (1 pass and one-direction printing) of a color bubble jet printer BJC-820J manufactured by Canon, and the degree of bleeding on the boundary of the adjacent colors was visually observed. "⊚" was marked for images in which substantially no bleeding occurred. "o" was marked for images in which bleeding occurred slightly to an extent which would not be a problem in practical operation. "x" was marked for images in which bleeding occurred at a level higher than that of images marked with "o".

5. Water resistance

Solid images and alphameric characters were printed using inks of yellow, magenta, cyan and black. After the images and characters were exposed to air for an hour, they were immersed in tap water having a temperature of 20° C. for 10 seconds. After the printed images and characters were taken out of the water, the water on the surface of the recorded images was removed by slightly pressing a filter paper thereon. The printed images were dried and the water resistance thereof was visually evaluated. In the printed images of yellow, magenta, cyan and black inks, the image having the lowest water resistance was selected as the water resistance evaluation result. Water resistance evaluation standards are as follows:

⊚: Flow of the recording agent to the margin was not seen. Fogging was hardly seen. Bleeding of the alphameric characters hardly occurred.

o: Flow of the recording agent to the margin occurred slightly. Bleeding of the alphameric characters occurred slightly, to an extent which would not be a problem in practical operation.

x: Flow of the recording agent to the margin occurred to a great extent. Fogging was remarkable. Bleeding of the alphameric characters was also remarkable.

The area on the recording medium where the liquid composition was attached in the above evaluations was the same as the image forming area for the ink. Printing duty was 100% for both the liquid composition and the inks. Printing direction was one direction.

Table 2 lists the evaluation results of the above-described tests on the images formed in Examples 1 to 8 and Comparative Example 1. As can be seen from Table 2, images exhibiting excellent image density fixing property, character quality, bleeding and water resistance were obtained in the Examples of the present invention. The fixing property, bleeding and water resistance of the images of Comparative Example 1 were inferior.

TABLE 2

| | Evaluation result | | | | |
|---|---|---|---|---|---|
| | Image density | Fixing property | Character quality | Bleeding | Water resistance |
| Example 1 | ⊚ | ⊚ | ⊚ | ⊚ | ⊚ |
| Example 2 | ⊚ | ⊚ | ⊚ | o | ⊚ |
| Example 3 | o | o | ⊚ | ⊚ | ⊚ |
| Example 4 | o | o | ⊚ | o | ⊚ |
| Example 5 | ⊚ | ⊚ | ⊚ | ⊚ | ⊚ |
| Example 6 | ⊚ | ⊚ | ⊚ | o | ⊚ |
| Example 7 | ⊚ | o | ⊚ | ⊚ | ⊚ |
| Example 8 | ⊚ | o | ⊚ | o | ⊚ |
| Comparative Example 1 | ⊚ | Δ | ⊚ | x | x |

Example 9

A solid image was recorded at a printing duty of 100% using the liquid composition A employed in Example 1 and yellow, magenta and cyan inks in the ink I employed in Example 1 to form what is known as a process black. The printing conditions were the same as in Example 1. The evaluation results of the density, fixing property, character quality and water resistance of the thus-produced images and bleeding on the boundary between the process black and other colors were all good, confirming the advantages of the present invention.

As will be understood from the foregoing description, color ink jet recording conducted according to the present invention on plain paper exhibits high-speed fixing property, high printing quality and sufficient image density and offers highly uniform solid images and high-definition images having no bleeding and exhibiting excellent color reproduction. In addition, the produced images are completely water-resistant.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A liquid composition comprising a cationic substance and finely ground cellulose.

2. The liquid composition according to claim 1, wherein the cationic substance has a molecular weight of 1000 or less on the basis of weight average.

3. The liquid composition according to claim 1, wherein said finely ground cellulose has an average particle size of 5.0 μm or less.

4. The liquid composition according to claim 1, wherein each of said cationic substance and said finely ground cellulose is present in an amount from 0.05 to 20% by weight of the liquid composition.

5. The liquid composition according to claim 1, wherein the mixture ratio of said cationic substance and said finely ground cellulose is between 10:1 and 1:10.

6. The liquid composition according to claim 1, further comprising a cationic polymer.

7. The liquid composition according to claim 6, wherein said polymer has a molecular weight of at least 2000.

8. The liquid composition according to claim 1, further comprising water and a water-soluble organic solvent.

9. The liquid composition according to claim 1, wherein said cationic substance comprises a surfactant.

10. An ink set comprising the liquid composition of any of claims 1 through 9 and at least one ink selected from the group consisting of yellow, magenta, cyan, black, red, blue and green inks.

11. An ink set comprising the liquid composition of any of claims 1 through 9, yellow ink, magenta ink and cyan ink.

12. An ink set comprising the liquid composition of any of claims 1 through 9, yellow ink, magenta ink, cyan ink and black ink.

13. The ink set according to claim 10, wherein said ink contains an anionic compound.

14. The ink set according to claim 10, wherein said ink contains a water-soluble dye having an anionic group.

15. The ink set according to claim 10, wherein said ink contains a pigment and an anionic compound.

16. An image-forming method comprising:

step (A) of attaching the liquid composition of any of claims 1 through 9 to at least an image-forming area of a recording medium; and step (B) of applying an ink containing an anionic compound to said recording medium in an ink jet process.

17. The image-forming method according to claim 16, wherein said ink jet process is an on-demand ink jet process.

18. The image-forming method according to claim 16, wherein said liquid composition is attached to said recording medium by an ink jet process.

19. The image-forming method according to claim 16, wherein heat energy is applied to said ink in said ink jet process.

20. The image-forming method according to claim 16, wherein step (A) precedes step (B).

21. The image-forming method according claim 16, wherein step (A) follows step (B).

22. An image-forming apparatus comprising:

the ink set of claim 10; and ink jet means.

23. An-image forming apparatus comprising:

a first recording unit having an accommodation portion and discharge means for the liquid composition set forth in any of claims 1 through 9; and a second recording unit having an accommodation portion and discharge means for an ink containing at least an anionic compound.

24. The image-forming apparatus according to claim 23, wherein the discharge means of at least the second recording unit comprises ink jet means.

25. The image-forming apparatus according to claim 22, wherein said ink jet means comprises means for applying heat energy to an ink to form an ink droplet.

* * * * *

UNITED STATES PATENT AND TRADEMARK OFFICE
CERTIFICATE OF CORRECTION

PATENT NO. : 5,618,338
DATED : April 8, 1997
INVENTOR(S) : YUTAKA KURABAYASHI, ET AL.

It is certified that error appears in the above-indentified patent and that said Letters Patent is hereby corrected as shown below:

COLUMN 2

Line 11, "laid-Open" should read --Laid-Open--; and
    Line 32, "plain." should read --plain paper.--.

COLUMN 5

Line 25, delete "difficult".

COLUMN 13

Line 26, delete "(Manufacture of ink I)"; and
    Line 28, before the paragraph beginning "Next," insert --¶(Manufacture of Ink I)--

COLUMN 14

Line 66, "Of" should read --of--.

COLUMN 15

Line 21, delete "(Manu-"; and
    Line 22, "facture of ink II)" should read
        --¶(Manufacture of ink II)--.

UNITED STATES PATENT AND TRADEMARK OFFICE
CERTIFICATE OF CORRECTION

PATENT NO. : 5,618,338
DATED : April 8, 1997
INVENTOR(S) : YUTAKA KURABAYASHI, ET AL.

It is certified that error appears in the above-indentified patent and that said Letters Patent is hereby corrected as shown below:

COLUMN 16

Line 12, "was" should read --were--.

COLUMN 20

Line 30, "according" should read --according to--; and
Line 35, "An-image forming" should read --An image-forming--.

Signed and Sealed this

Sixteenth Day of December, 1997

Attest:

BRUCE LEHMAN

Attesting Officer

Commissioner of Patents and Trademarks